Figure 1:
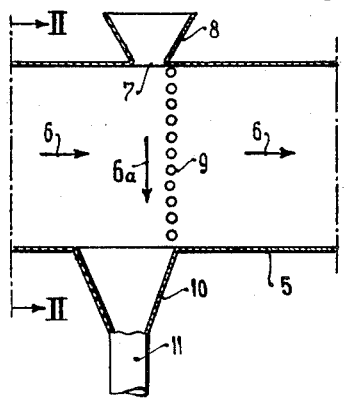

Oct. 2, 1956     J. H. FRANKEN     2,765,079

SIFTERS

Filed May 24, 1954

Inventor
Jan H. Franken
By Stevens, Davis, Miller + Mosher
his attorneys

United States Patent Office 2,765,079
Patented Oct. 2, 1956

2,765,079

SIFTERS

Jan H. Franken, Heemstede, Netherlands, assignor to Bureau van Tongeren N. V., Heemstede, Netherlands, a company of the Netherlands Application May 24, 1954, Serial No. 431,963

Claims priority, application Netherlands June 11, 1953

3 Claims. (Cl. 209—250)

This invention relates to a sifter adapted to separate dust into two fractions of different particle sizes, said sifter comprising a gas conduit having an unimpeded cross section of approximately uniform area and provided in its top wall with a dust inlet opening and in its bottom wall with a dust outlet opening substantially vertically below the dust inlet opening. In a sifter of this type, the value of the horizontal component of the gas flowing through said conduit determines the line between the particle sizes of the two fractions.

Sifters of the type referred to are, generally speaking, not adapted to bring about a sharp separation of the two fractions, i. e. the coarse fraction still contains an appreciable amount of fines, and vice versa. My invention, which has for its object to improve the separating effect of these sifters, consists herein that mounted behind but close to the dust inlet opening is a substantially vertical grate composed of approximately horizontal bars, said grate occupying substantially the entire cross sectional area of the conduit, and the width of the gaps between the bars exceeding the diameter of the largest particles present in the dust to be treated.

It has been found that a grate of the type referred to greatly improves the sharpness of the separation. This is probably due to the fact that the dust particles, in order to escape through the gaps between the grate bars, have to follow a path having a small radius of curvature, during which movement the relatively coarse particles strike against the bars so as to recoil.

Another advantageous feature of the invention is that, for a given line of division between the particle sizes of the two fractions and for equal ratios between the weight of the amount of dust to be handled per unit of time and the weight of the amount of gas required per unit of time, a sifter constructed in accordance with the invention has an appreciably higher capacity than a grateless sifter. Owing thereto, the width of a sifter in accordance with the invention may be appreciably smaller than that of a conventional sifter having the same capacity, and this tends to improve the uniformity of the distribution of the dust supplied to the sifter by means of a chute or like element.

Preferably, the dust is supplied to the inlet opening in the top wall of the conduit by means of a chute provided with means allowing its slope to be adjusted. Owing thereto, the speed and the direction of the dust stream falling into the conduit and, as a consequence, both the sharpness of the separation and the amount of dust supplied per unit of time, can be varied.

Furthermore, it is preferred for the downstream section of the conduit, i. e. the section behind the grate, to have a cross sectional area smaller than that of the upstream section. It has, indeed, been found that, in order to secure a sharp separation, the velocity of flow of the gas where the latter crosses the path of the falling dust has, in most cases, to be lower than is required for a ready transport of the fines.

Moreover, the sharpness of the separation can still be increased by the provision of a substantially horizontal grate in the discharge opening for the coarse fraction, which opening is, as a matter of coarse, located substantially vertically below the dust inlet opening. The explanation thereof is that the bunker or the funnel for receiving the coarse fraction and mounted close to and vertically below the discharge opening, acts as an abrupt enlargement of the conduit, so that it creates eddies in front of the vertical grate, and these eddies are likely to impair the desired separation.

Finally, it is advisable, in the treatment of a moist mass of dust having a tendency to clot, so that the fines therein cannot readily be separated from the coarse fraction, to use hot gas, for instance, hot combustion gases. In most cases, satisfactory results are then obtained.

In order that my invention may be well understood, reference is had to the accompanying drawing, which illustrates, by way of example only, two embodiments thereof. In said drawing:

Fig. 1 is a cross section of the first embodiment taken along the line I—I in

Figure 2:
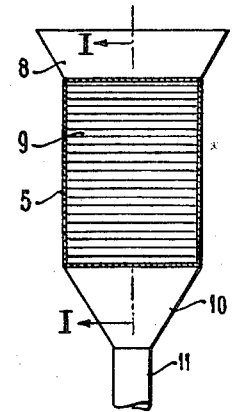

Fig. 2, which is a section along the line II—II in Fig. 1.

Figure 3:
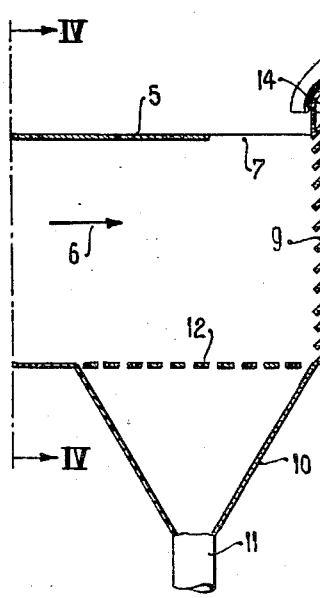
Figure 4:
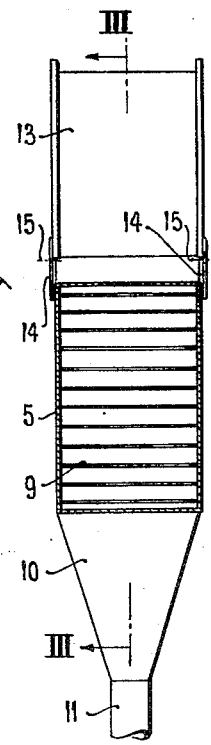

Figs. 3 and 4 are similar sections of the second embodiment.

In accordance with Figs. 1 and 2, the horizontal, straight conduit, designated by 5, has a uniform, rectangular cross section throughout its length. The arrows 6 indicate the direction in which air is caused to flow through the conduit.

The top wall of the conduit has an inlet opening 7 extending through the full width thereof. Mounted vertically above said inlet is a hopper 8. A vertical grate 9 occupying the full cross sectional area of the conduit is mounted, as viewed in the direction of flow of the air, behind but close to the opening 7. Opening into the bottom wall of the conduit, immediately in front of said grate and, consequently, vertically below the inlet opening 7, is a funnel-shaped bunker 10 provided with a discharge pipe 11 through which the coarse fraction can be discharged, continuously or intermittently, as desired.

The vertical grate 9 is composed of straight, horizontal bars having circular cross sections and being relatively widely spaced. The width of the gaps between the bars may be appreciably greater than the diameter of the largest particles present in the dust treated.

In view of the statements of the preamble to this specification, the modus operandi of the sifter illustrated in Figs. 1 and 2 need not be explained in detail. The dust to be separated into a relatively coarse and a relatively fine fraction is supplied to the hopper 8 whence it falls, substantially in the direction of the arrow 6a, through the conduit 5 and through the current of air flowing therein. The particles of maximum size will reach the bunker 10 without having engaged the vertical grate 9, but the smaller and the smallest particles are appreciably deviated, by the flow of air, from their substantially vertical path so as to strike against the bars of said grate, mainly against the upper portions thereof. As a consequence, said particles will recoil and, a moment later, again be thrown against the grate. During these interruptions of the free fall of said particles, the flow of air will bring about a much sharper separation between the two fractions than would be possible if the free fall of the dust were not interfered with.

In accordance with Figs. 3 and 4, the downstream section of conduit 5, i. e. the section behind the grate 9, which, in this instance, is composed of rearwardly and upwardly inclined blades, has a considerable upward slope and a cross sectional area considerably smaller than that of the upstream section. Furthermore, the bottom wall of the conduit extends, in the form of a perforate sheet or of a grate, over the mouth of the bunker 10. The effect of this horizontal grate has been explained hereinbefore, and the same remark applies to the chute 13 for feeding the dust to the inlet opening 7. The lower end of said chute is provided with lugs 14 adapted to swing about a horizontal cross axis 15.

The air carrying the fines and having passed the vertical grate 9 may be supplied to a dust separator, and the cleaned air may then be recycled to the upstream section of the conduit.

It is pertinent still to remark that the term "dust" used in this specification and in the claims is meant to mean any relatively finely comminuted material.

What I claim is:

1. A sifter for separating dust into fractions of different particle size comprising a substantially horizontally disposed gas conduit having an unimpeded cross section of approximately uniform area and having a top wall and a bottom wall and provided in its top wall with a dust inlet opening and in its bottom wall with a dust outlet disposed substantially vertically below the dust inlet opening, a substantially vertically disposed grate disposed immediately behind the dust inlet, said grate occupying substantially the entire cross sectional area of the conduit and through which the gas in the conduit passes, said grate being composed of approximately horizontally disposed bars, said bars being spaced apart vertically a distance to provide an aperture between each of the bars which exceeds the diameter of the largest particles present in the dust to be treated and said bars each having an upper surface which is inclined in a direction facing the movement of the gas downwardly toward the bottom wall of the conduit.

2. A sifter as claimed in claim 1, wherein said conduit has a section behind the grate of a smaller cross sectional area than the conduit section in front of the grate.

3. A sifter as claimed in claim 1, wherein a dust supply chute adjustably overlies the inlet opening in the top wall and means is provided for adjusting the slope of the chute.

References Cited in the file of this patent
UNITED STATES PATENTS

| | | |
|---|---|---|
| 62,537 | Ficken | Mar. 5, 1867 |
| 504,240 | Patterson | Aug. 29, 1893 |
| 852,050 | Barbeau | Apr. 30, 1907 |
| 1,679,757 | Anderson | Aug. 7, 1928 |
| 2,130,346 | Gerken | Sept. 20, 1938 |